Oct. 25, 1960 J. VARGO 2,957,507
ROUTING JIG
Filed June 18, 1959 2 Sheets-Sheet 1
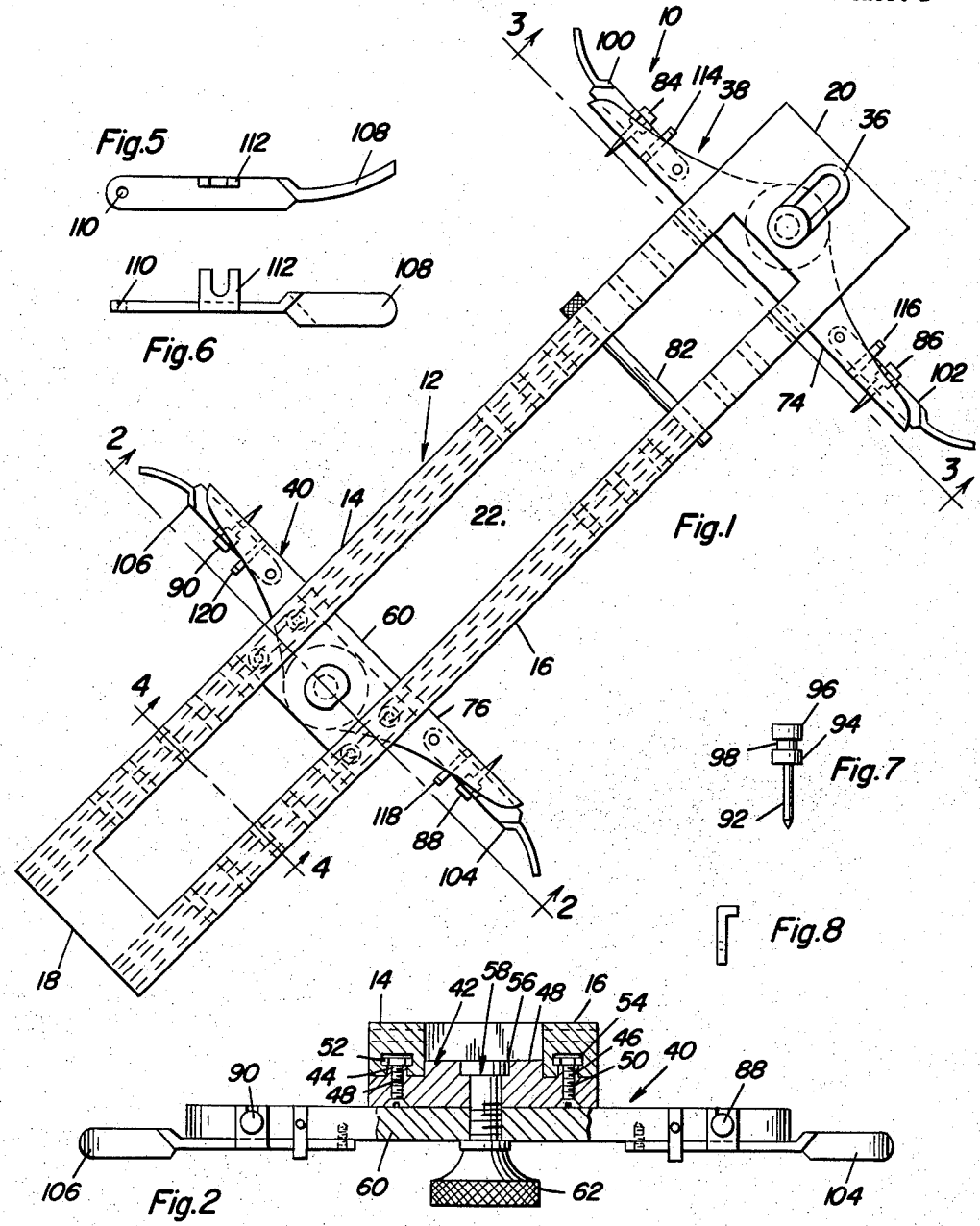
John Vargo
INVENTOR.

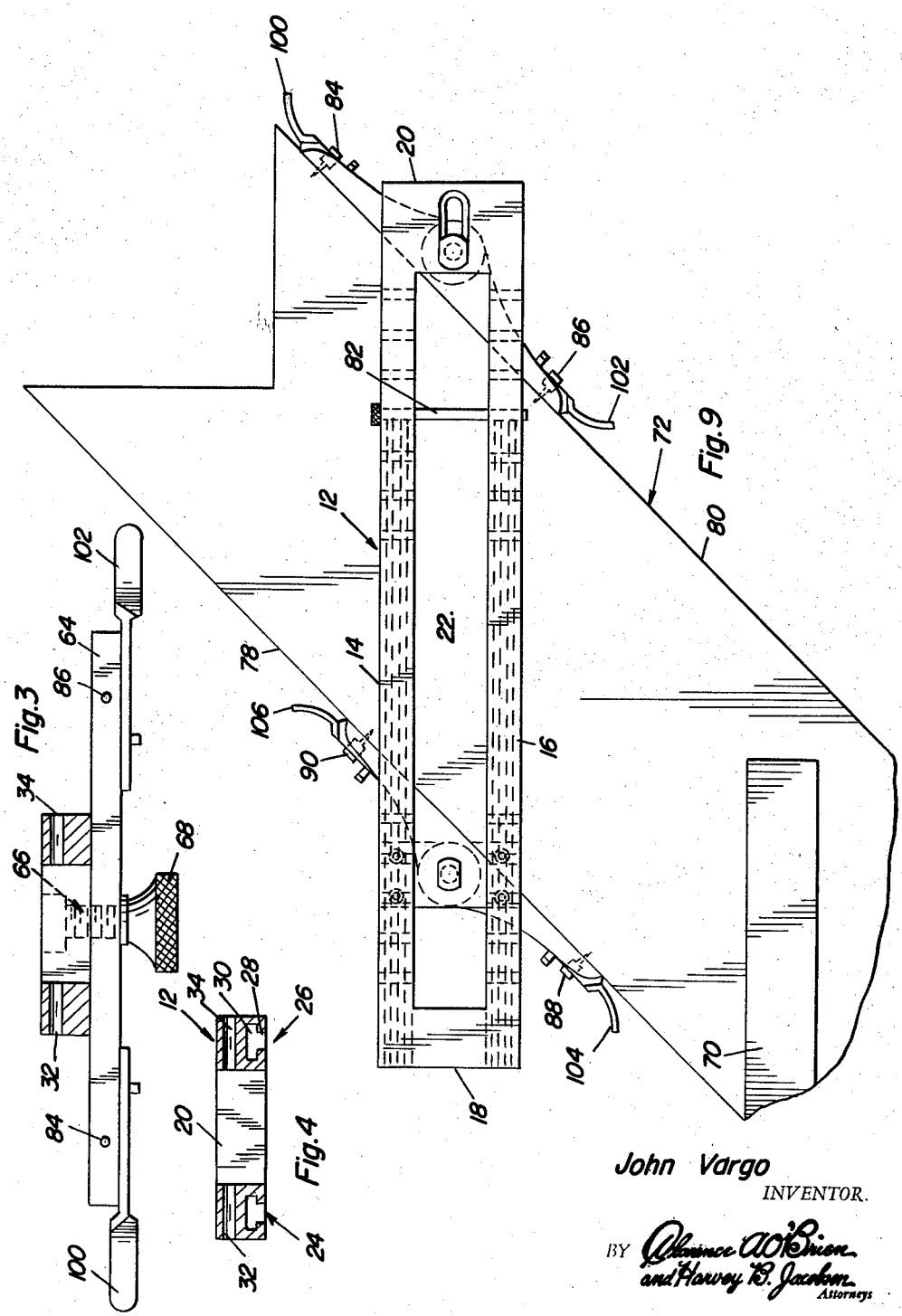

United States Patent Office 2,957,507
Patented Oct. 25, 1960

2,957,507
ROUTING JIG
John Vargo, 1648 Tanner Ave. SW., Canton 6, Ohio
Filed June 18, 1959, Ser. No. 821,199
10 Claims. (Cl. 144—144.5)

This invention relates generally to carpenter's equipment and more particularly to a routing jig utilized for providing a guide or the boundaries of a desired cutting area for directing the routing tool.

Although the prior art discloses various routing jig structures, they all are limited in their versatility and usage. The routing jig described below is extremely versatile and easy to manipulate inasmuch as there are relatively few separate parts. Though the jig finds its greatest use in routing basement steps from stringers, other important uses are to be noted. The jig may be used for routing out plank jambs, steps, for shelving, for inlaid woodwork, and also for kerfing.

The object of this invention is to provide a novel routing jig construction to facilitate various routing operations.

It is a more particular object of this invention to provide a novel routing jig construction which includes a minimum number of adjustable parts without minimizing the effectiveness of the jig. The jig initially includes an open frame having a pair of fences secured thereto. The first fence of the pair is pivotally secured to the frame at one end thereof while the second fence is pivotally and slidably secured to the frame. The fences of course each have straight edges for abutting a workpiece with the open portion or aperture formed in the frame overlaying the workpiece to provide the boundaries of the routing or cutting area. Means are provided for adjusting the length of cut in the workpiece.

It is a further object of this invention to provide a novel routing jig construction which may be easily clamped to the workpiece at a desired angle to assure the carpenter of a consistent and accurate cut. The means for securing the routing jig to the workpiece includes pins extending through the fences to the straight edges thereof with the pins penetrating the workpiece to secure the jig thereto. Releasing levers are provided and are pivotally fixed to the fences remote from the handle portion of the lever. The levers carry a U-shaped projection which underlies a flange on the pins for lifting the pin from the workpiece as desired to remove the pins from engagement with the workpiece.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the routing jig illustrating in dotted lines the various passages and apertures formed in the jig;

Figure 2 is an enlarged sectional view taken substantially along the plane 2—2 of Figure 1;

Figure 3 is an enlarged sectional view taken substantially along the plane 3—3 of Figure 1;

Figure 4 is an enlarged sectional view taken substantially along the plane 4—4 of Figure 1;

Figure 5 is a side elevational view of one of the releasing levers;

Figure 6 is a top plan view of a releasing lever;

Figure 7 is an elevational view of a pin utilized to secure the routing jig to a workpiece;

Figure 8 is an elevational view of a stop member utilized to limit the pivotal movement of a releasing lever; and Figure 9 is a top plan view of the routing jig illustrating it being used in conjunction with a stringer for routing out basement stairs.

With continuing reference to the drawings, numeral 10 generally designates the routing jig comprising this invention and includes initially a rectangular frame 12 having spaced side members 14 and 16 and spaced end members 18 and 20 integrally formed and defining a rectangular aperture 22 in the center thereof. The frame 12 defines T-shaped slots 24 and 26 extending through the undersurface of the side members 14 and 16. Each of the T-shaped slots 24 and 26 includes a vertical leg 28 and a horizontal portion 30. Aligned cylindrical apertures 32 and 34 are defined respectively in the side members 14 and 16. A counterbored elliptical opening 36 is formed in the end member 20.

In order to secure the frame 12 on a workpiece with the aperture 22 defining the boundaries of the routing or cutting area, a pair of fence assemblies 38 and 40 are provided. Initially referring to the fence assembly 40, attention is drawn to Figures 1 and 2. The fence assembly 40 initially includes a fence slide 42 having upstanding projections 44 and 46 adapted to be slidably received within the vertical legs 28 of the T-shaped slots 24 and 26 respectively. A central projection 48 is slidably received in the opening 22 between the side members 14 and 16. Extending upwardly through the fence slide 42 and particularly the projections 44 and 46, are a pair of bolts 48 and 50 receiving nuts 52 and 54 thereon. The nuts 52 and 54 are received within the horizontal portions 30 of the T-slots 24 and 26 respectively for securing the fence slide 42 to the frame 12 in sliding relationship thereto. A non-circular counterbored aperture 56 is formed in the upper surface of the fence slide 42 and receives therethrough a bolt 58 having a non-circular head thereon. The bolt 58 extends entirely through the fence slide 42 and through the fence 60, receiving the knurled nut 62 thereon. With the knurled nut 62 sligthly loosened, it will be apparent that the fence 60 may pivot on the bolt 52 so as to rotate relative to the fence slide 42 while the fence slide 42 and fence 60 may slide in the T-slots 24 and 26 relative to the frame 12.

The fence assembly 38 includes a fence 64 passing a bolt 66 having a non-circular head received in the counterbored elliptical opening 36. The bolt 66 also receives a knurled head 68 thereon and it will be noted that the fence 64 may rotate relative to the frame 12. The remaining characteristics of the two fence assemblies 38 and 40 are identical and accordingly a generic explanation will be presented.

Referring to Figure 9, in order to rout out basement steps as 70 from a stringer 72, the frame 12 must be positioned on the stringer 72 as illustrated, the angle depending on the stairway grade desired. The straight-edges 74 and 76 of the fence assemblies 38 and 40 respectively are intended to abut the edges 78 and 80 of the stringer 72. It will be seen that the aperture 22 then overlies the stringer 72 and the side members 14 and 16 define the width of the stair 70. A pin 82 may be received in the aligned apertures 32 and 34 of the side members 14 and 16 respectively in order to define the desired length of the stair 70.

In order to maintain the frame 12 secured to the stringer 72, pin means are provided in each of the fences 60 and 64. Initially, four pins 84, 86, 88 and 90 project through the fences 60 and 64 respectively with the pointed ends of the pins extending through the straightedges 74 and 76. An exemplary pin is illustrated in Figure 7 and includes a pointed shank portion 92 and a pair of flanges 94 and 96 bridged by a reduced portion 98. Release levers 100, 102, 104 and 106 are pivoted on the fences 64 and 60, respectively, as illustrated. Referring to Figures 5 and 6, it will be seen that the exemplary release lever includes a handle portion 108 and an aperture 110 through which a pivot pin pivotally secures the release lever to the fence. A U-shaped projection 112 extends transversely to the release lever. The U-shaped projection is positioned so that the legs thereof enclose the reduced portion 98 between the flanges 94 and 96 of the pins. Therefore, when the routing jig 10 is positioned on the stringer 72 as illustrated in Figure 9, the pins 84, 86, 88 and 90 are free to be tapped into the surfaces 78 and 80 to secure the routing jig to the stringer 72. However, when it is desired to remove the routing jig from the stringer 72, the release levers 100, 102, 104, and 106 may be pivoted by the handle 108 to force the U-shaped projection 112 to raise the pins by the flange 96. In turn, the pins may be pressed into the stringer 72 by forcing the U-shaped projeciton 112 against the lower flange 94. In order to limit the pivotal movement of the release levers, a stop member designated by the numerals 114, 116, 118 and 120 and specifically illustrated in Figure 8 is utilized. Since the movement of the release levers 100, 102, 104, 106 is limited by the stop members 114, 116, 118, 120, it will be noted that the pins 84, 86, 88, 90 may not become separated from the fences 64 and 60.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A routing jig adapted to be secured to a workpiece for providing boundaries of a cutting area comprising a flat elongated rectangular frame having an elongated aperture therein, securing means for adjustably securing said jig to said workpiece so that said aperture overlies said workpiece and said frame defines said boundaries, said securing means including a pair of fences having straightedges adapted to engage said workpiece therebetween, a first of said fences being pivotally secured to said elongated frame adjacent a first end thereof, a second of said fences being pivotally and slidably retained on said frame, removable pin means extending through the straight edges of said fences for gripping a workpiece disposed therebetween.

2. A routing jig adapted to be secured to a workpiece for providing boundaries of a cutting area comprising a flat elongated rectangular frame having an elongated aperture therein, securing means for adjustably securing said jig to said workpiece so that said aperture overlies said workpiece and said frame defines said boundaries, said securing means including a pair of fences having straightedges adapted to engage said workpiece therebetween, a first of said fences being pivotally secured to said elongated frame adjacent a first end thereof, a second of said fences being pivotally and slidably retained on said frame, removable pin means extending through the straight edges of said fences for gripping a workpiece disposed therebetween, and means for varying the length of the defined cutting area.

3. A routing jig adapted to be secured to a workpiece for providing boundaries of a cutting area comprising a flat elongated rectangular frame having an elongated aperture therein, securing means for adjustably securing said jig to said workpiece so that said aperture overlies said workpiece and said frame defines said boundaries, said securing means including a pair of fences having straightedges adapted to engage said workpiece therebetween, elongated T-shaped slots defined in said frame, a fence slide, bolts extending through said fence slide and receiving nuts thereon, said bolts extending through the vertical legs of said T-shaped slots, said nuts slidably disposed in the horizontal portion of said T-shaped slots.

4. A routing jig adapted to be secured to a workpiece for providing boundaries of a cutting area comprising a flat elongated rectangular frame having an elongated aperture therein, securing means for adjustably securing said jig to said workpiece so that said aperture overlies said workpiece and said frame defines said boundaries, said securing means including a pair of fences having straightedges adapted to engage said workpiece therebetween, elongated T-shaped slots defined in said frame, a fence slide, bolts extending through said fence slide and receiving nuts thereon, said bolts extending through the vertical legs of said T-shaped slots, said nuts slidably disposed in the horizontal portion of said T-shaped slots, removable pin means extending through the straight edges of said fences for gripping a workpiece disposed therebetween.

5. A routing jig adapted to be secured to a workpiece for providing boundaries of a cutting area comprising a flat elongated rectangular frame having an elongated aperture therein, securing means for adjustably securing said jig to said workpiece so that said aperture overlies said workpiece and said frame defines said boundaries, said securing means including a pair of fences having straightedges adapted to engage said workpiece therebetween, elongated T-shaped slots defined in said frame, a fence slide, bolts extending through said fence slide and receiving nuts thereon, said bolts extending through the vertical legs of said T-shaped slots, said nuts slidably disposed in the horizontal portion of said T-shaped slots, removable pin means extending through the straightedges of said fences for gripping a workpiece disposed therebetween, said removable pin means including a pair of releasing levers, each having a handle and being pivotally attached to each fence remote from the handles, a U-shaped extension carried by each of said levers, flanged pins extending through said fence to said straightedge, said extension underlying said flange.

6. A routing jig adapted to be secured to a workpiece for providing boundaries of a cutting area comprising a flat elongated rectangular frame having an elongated aperture therein, securing means for adjustably securing said jig to said workpiece so that said aperture overlies said workpiece and said frame defines said boundaries, said securing means including a pair of fences having straightedges adapted to engage said workpiece therebetween, a first of said fences being pivotally secured to said elongated frame adjacent a first end thereof, a second of said fences being pivotally and slidably retained on said frame, removable pin means extending through the straight edges of said fences for gripping a workpiece disposed therebetween, and means for varying the length of the defined cutting area, elongated T-shaped slots defined in said frame, a fence slide, bolts extending through said fence slide nad receiving nuts thereon, said bolts extending through the vertical legs of said T-shaped slots, said nuts slidably disposed in the horizontal portion of said T-shaped slots.

7. A routing jig adapted to be secured to a workpiece for providing boundaries of a cutting area comprising a flat elongated rectangular frame having an elongated aperture therein, securing means for adjustably securing said jig to said workpiece so that said aperture overlies said workpiece and said frame defines said boundaries, said securing means including a pair of fences having straightedges adapted to engage said workpiece therebetween, a first of said fences being pivotally secured to said elongated frame adjacent a first end thereof, a second of said fences being pivotally and slidably retained on said frame, removable pin means extending through the straight edges of said fences for gripping a workpiece disposed therebetween, and means for varying the length of the defined cutting area, said removable pin means including a pair of releasing levers, each having a handle and being pivotally attached to each fence remote from the handles, a U-shaped extension carried by each of said levers, flanged pins extending through said fence to said strtaightedge, said extension underlying said flange.

8. A routing jig adapted to be secured to a workpiece for providing boundaries of a cutting area comprising a flat elongated rectangular frame having an elongated aperture therein, securing means for adjustably securing said jig to said workpiece so that said aperture overlies said workpiece and said frame defines said boundaries, said securing means including a pair of fences having straightedges adapted to engage said workpiece therebetween, a first of said fences being pivotally secured to said elongated frame adjacent a first end thereof, a second of said fences being pivotally and slidably retained on said frame, removable pin means extending through the straight edges of said fences for gripping a workpiece disposed therebetween, said removable pin means including a pair of releasing levers, each having a handle and being pivotally attached to each fence remote from the handles, a U-shaped extension carried by each of said levers, flanged pins extending through said fence to said straightedge, said extension underlying said flange.

9. A routing jig adapted to be secured to a workpiece for providing boundaries of a cutting area comprising a flat elongated rectangular frame having an elongated aperture therein, securing means for adjustably securing said jig to said workpiece so that said aperture overlies said workpiece and said frame defines said boundaries, said securing means including a pair of fences having straightedges adapted to engage said workpiece therebetween, removable pin means extending through the straight edges of said fences for gripping a workpiece disposed therebetween.

10. A routing jig adapted to be secured to a workpiece for providing boundaries of a cutting area comprising a flat elongated rectangular frame having an elongated aperture therein, securing means for adjustably securing said jig to said workpiece so that said aperture overlies said workpiece and said frame defines said boundaries, said securing means including a pair of fences having straightedges adapted to engage said workpiece therebetween, removable pin means extending through the straight edges of said fences for gripping a workpiece disposed therebetween, said removable pin means including a pair of releasing levers, each having a handle and being pivotally attached to each fence remote from the handles, a U-shaped extension carried by each of said levers, flanged pins extending through said fence to said straightedge, said extension underlying said flange.

References Cited in the file of this patent

UNITED STATES PATENTS

| | | |
|---|---|---|
| 256,864 | Stinson | Apr. 25, 1882 |
| 299,843 | Osborn | June 3, 1884 |
| 429,203 | Sajous | June 3, 1890 |
| 1,022,883 | Seguin | Apr. 9, 1912 |
| 1,035,328 | Drenner | Aug. 13, 1912 |
| 1,115,995 | Wilson | Nov. 3, 1914 |
| 1,679,074 | Carter | July 31, 1928 |
| 2,427,081 | Zern | Sept. 9, 1947 |